(Model.)
R. WHITEHILL.
HUB FOR COUPLINGS OR PULLEYS.
No. 279,623. Patented June 19, 1883.
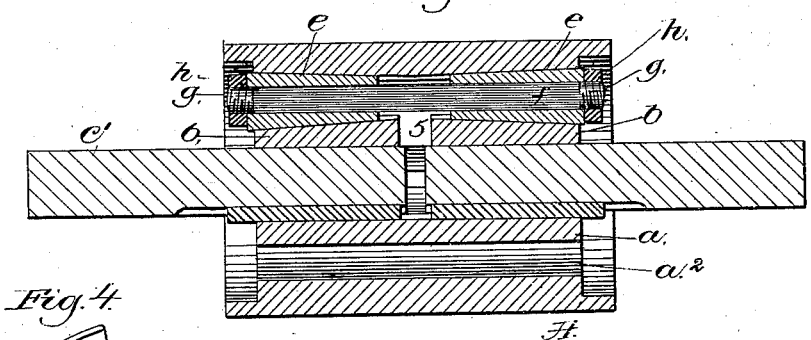
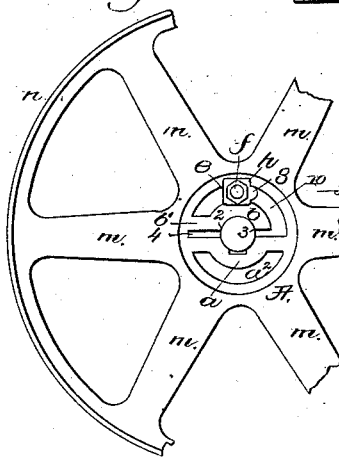
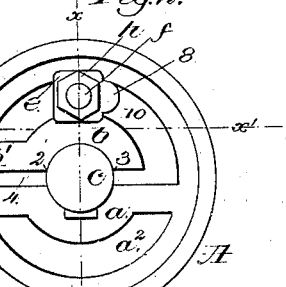
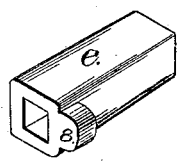
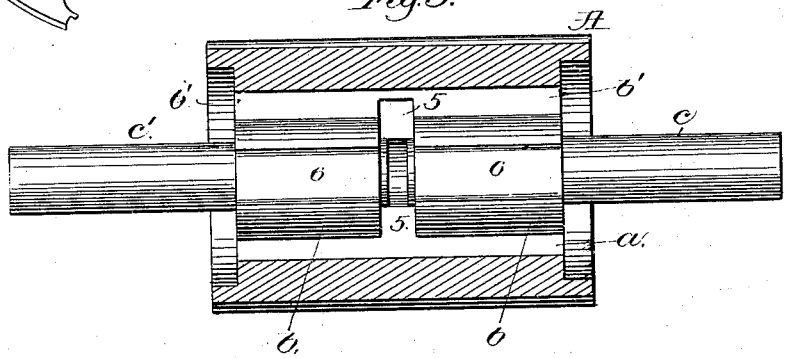
Witnesses.
John F. C. Brinkert.
Fred A. Powell.
Inventor:
Robert Whitehill.
by Crosby & Gregory Attys.

UNITED STATES PATENT OFFICE.

ROBERT WHITEHILL, OF MILWAUKEE, WISCONSIN.

HUB FOR COUPLINGS OR PULLEYS.

SPECIFICATION forming part of Letters Patent No. 279,623, dated June 19, 1883.

Application filed October 11, 1882. (Model.)

*To all whom it may concern:*

Be it known that I, ROBERT WHITEHILL, of Milwaukee, county of Milwaukee, State of Wisconsin, have invented an Improvement in Hubs for Couplings or Pulleys, of which the following description, in connection with the accompanying drawings, is a specification.

My invention has for its object the production of a simple and efficient hub or coupling to be employed for connecting together the ends of two shafts, the said hub having its bearing-surfaces in contact with one part of the shaft adapted to yield under the action of certain wedges, to be hereinafter described, they springing and forcing the said bearing-surfaces against and so as to clamp the shafts placed centrally in the said hub, the said surface adapting itself readily to the diameters of the ends of the said shafts should they vary in size within certain limits.

In this my invention I employ a cast-metal hub having its bearing-surfaces separated in halves by coring, one of the said halves being connected with the interior of the hub-shell only at one side thereof, the said half being further divided transversely near its center to form two independent adjustable parts, as will be described hereinafter, so that each part may be sprung independently by a suitable wedge.

Figure 1 represents in longitudinal section one of my improved hubs for a shaft-coupling applied to the ends of two shafts, shown in elevation, the said figure showing the wedges in section, the line of section being represented by the dotted line $x$, Fig. 2. Fig. 2 is an end view of the hub for the coupling. Fig. 3 is a longitudinal section thereof on the dotted line $x'$, Fig. 2. Fig. 4 represents my invention embodied in the hub of a belt-pulley, and Fig. 5 is a separate view of one of the wedges.

The hub A, of usual construction, has a bearing-surface, $a$, herein shown as a web connected at each end with the interior of the shell of the hub, the open space $a^2$ next the said surface being left only for the purpose of saving metal and properly distributing and balancing the mass of metal. The uppermost bearing-surface, $b$, of the hub, as shown in the drawings, bored to fit the shafts $c\ c'$, is attached to the interior of the shell by the narrow web $b'$. (Shown clearly in Fig. 2.) This surface $b$ is separated from the portion $a$ and from the interior of the shell of the hub by coring, leaving the surface $b$ as a projecting arm or lever, adapted by its convexed face to fit and inclose snugly nearly one-half the circumference of the shafts touched by it, and in the drawings it will be noticed that both corners 2 3 of the arm or lever-like portion $b\ b'$ are so connected with the shell of the hub A that the corners 2 and 3 of the surface $b$ and the continuous surface between them are free to be moved toward and from the bearing-surface $a$, thus enabling the part $b$—the only part of the hub which is made adjustable—to bear uniformly upon the shaft, and to fit all the parts of the said shaft equally under all adjustments, which would not be the case were it not for the space 4 between the corner 2 and the interior of the shell of the hub. If the space 4 were filled with metal, it is obvious that the concaved part of the surface $b$ in contact with the shaft under it could not be adjusted and be made to bear uniformly upon the periphery of the shaft touched by it, for the part of the said surface at the point marked 2 could not yield as the part thereof marked 3. So the open space 4 becomes, it will be seen, a matter of much importance, and is necessary to insure a powerful and uniform grasp of the shaft as the said surface $b\ b'$ is adjusted. The part $b\ b'$, along one side and near the interior of the shell, is provided with a tapering or inclined key-seat, shown best in Fig. 1, and marked 6 in Fig. 3, and in the said figure, as in Fig. 3, it will be observed that the part $b$ is separated transversely by a slot, 5, which divides the said hub into two pieces, thus enabling each of said pieces—one being connected with the hub-shell near one and the other with the hub-shell near its other end—to be sprung or moved independently to adapt the said separate portions $b\ b'$ to the ends of the two shafts $c\ c'$, which may be of different diameters. These separate portions $b\ b'$, both alike and marked alike, are acted upon each by an independent wedge, $e$, herein shown as made hollow to receive the screw-rod $f$, threaded at each end, and provided with nuts $h$ to adjust the said wedges and force them into the space 10 left between the bearing parts $b$ and the interior of the hub-shell.

By employing a rod threaded at each end and a nut for each end of the rod, instead of a rod with a head at one end and a screw and nut at its other end, I am enabled to maintain the rod always in the same position with relation to the ends of the hub, whereas with the rod having a head, as stated, and a nut only at one end, the rod would have to be moved longitudinally; but with the two nuts—one at each end—the rod may remain stationary and only the nuts be moved.

The wedges herein shown, having smooth tapering sides or acting faces, may be moved longitudinally by a blow from a hammer or otherwise, which would not be possible were the wedges made as screws entered into screw-threaded openings formed one-half in the parts $b$ and the other half in the hub-shell. Such a screw-wedge to move it would require the expenditure of very considerable power. Each wedge $e$, at one side, has an ear, 8, against which, when it is desired to remove a closely-fitted wedge from between the shell and part $b\ b'$, a rod or bar of iron may be placed and the wedge be started by a blow on the said bar.

Some part of the rod $f$ will be, or all of it may be, made square or of other shape than round, to prevent the rod turning in the said wedges.

I do not broadly claim a hub or shell having one portion of its hub made adjustable by a wedge-like device, so as to be clamped upon a shaft.

In Fig. 4, I have shown the hub so far described as provided with arms $m$ and a belt-receiving portion, $n$, and it will be understood that the surfaces $a\ b\ b'$ may be employed in the hub of a belt or other pulley without departing from my invention, as my invention relates to the hub, and in a hub such as shown in Fig. 4 it will be understood that I may use a single wedge.

I claim—

1. The hub-shell provided with the fixed bearing-surface $a$ and the bearing-surface $b$, connected at one end with and extended from the hub-shell by the neck $b'$, as described, combined with an adjustable wedge to spring or force the parts $b\ b'$ toward the part $a$, as set forth.

2. The hub-shell, its bearing-surface $a$, and the independently-adjustable part, combined with the wedges, substantially as described, to clamp and hold the ends of the two shafts, as set forth.

3. The hub-shell and the parts $b\ b'$ connected therewith, as described, combined with a wedge having an ear, 8, as and for the purpose set forth.

4. The hub-shell and its parts $a\ b\ b'$ connected therewith, as described, combined with the wedges and with a rod having adjusting-nuts at each end to operate the wedges, as set forth.

5. The hub-shell and its parts $a\ b\ b'$ connected therewith, as shown and described, and the hollow wedges, combined with the rod $f$, having nuts at its ends to move the wedges, as set forth.

In testimony whereof I have signed my name to this specification in the presence of two subscribing witnesses.

ROBERT WHITEHILL.

Witnesses:
G. W. GREGORY,
B. J. NOYES.